No. 645,888. Patented Mar. 20, 1900.
J. BURNS.
VEHICLE SEAT.
(Application filed June 29, 1899.)
(No Model.)
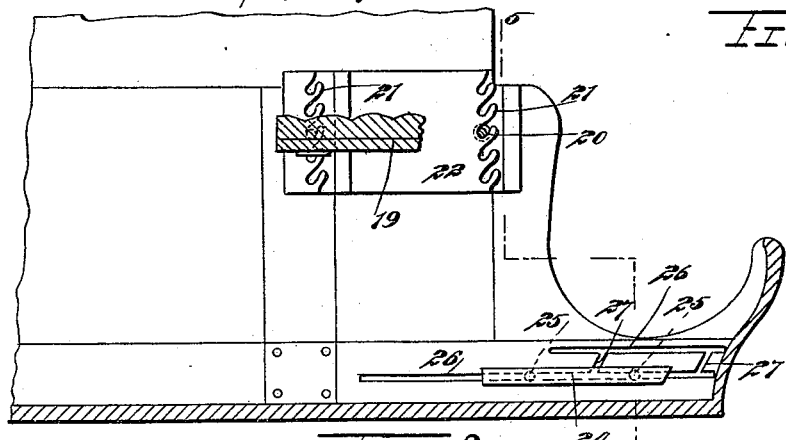
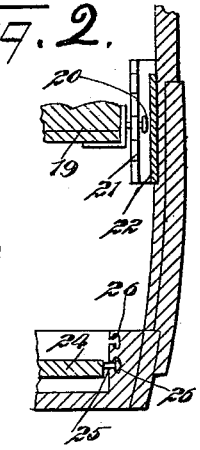
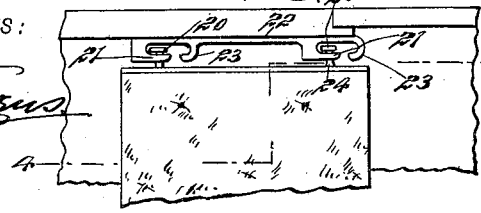
WITNESSES:
INVENTOR
James Burns
BY
ATTORNEYS
THE NORRIS PETERS CO., PHOTO-LITHO., WASHINGTON, D. C.

UNITED STATES PATENT OFFICE.

JAMES BURNS, OF CINCINNATI, OHIO.

VEHICLE-SEAT.

SPECIFICATION forming part of Letters Patent No. 645,888, dated March 20, 1900.

Application filed June 29, 1899. Serial No. 722,268. (No model.)

*To all whom it may concern:*

Be it known that I, JAMES BURNS, of Cincinnati, in the county of Hamilton and State of Ohio, have invented a new and Improved Vehicle-Seat, of which the following is a full, clear, and exact description.

This invention relates to certain improvements in the structure of vehicle-bodies, including the bodies of automobile vehicles, the improvements relating specifically to a new arrangement of the seat devices, the invention being especially fitted for use in connection with the running-gear disclosed in my copending application for Letters Patent filed of even date herewith.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a view illustrating the seat devices, the view being in section on the line 4 4 of Fig. 3. Fig. 2 is a section on the line 5 5 of Fig. 1, and Fig. 3 is a fragmentary plan view of the seat devices.

For the purpose of permitting the driver of the vehicle to readily adjust his seat the vehicle is provided with a seat 19, having laterally-projecting studs 20, and these studs 20 are adapted to engage ratchet-teeth 21, formed on a plate 22 at each side of the vehicle. The plate 22 is also provided with flanges 23, opposing the ratchet-teeth 21, so as to guide the studs 20 in their movement from one tooth to the other of the ratchet-plate. With such construction the seat 19 may be raised or lowered and held at any desired elevation or inclination.

Having thus described my invention, I claim as new and desire to secure by Letters Patent—

1. The combination with a vehicle, of ratchet-plates attached to the side walls of the vehicle-body, inside thereof, a seat, and studs attached rigidly to the seat and working with the ratchet-plates to adjustably hold the seat.

2. The combination of two plates adapted to be secured at opposite sides of the vehicle and each plate having two rows of ratchet-teeth formed thereon, each plate also having flanges facing the respective rows of ratchet-teeth, and a seat having two studs at each end, the studs respectively working with the rows of ratchet-teeth to adjustably hold the seat.

JAMES BURNS.

Witnesses:
JOHN H. COSTELLO,
JOHN DONEGAN.